United States Patent [19]

Feldman et al.

[11] Patent Number: 4,600,810

[45] Date of Patent: Jul. 15, 1986

[54] TELEPHONE LINE TESTER

[75] Inventors: Steven Feldman, Seminole; David J. Kimmel, Clearwater, both of Fla.

[73] Assignee: AMP Incorporated, Harrisburg, Pa.

[21] Appl. No.: 648,409

[22] Filed: Sep. 7, 1984

[51] Int. Cl.⁴ ............................................. H04B 3/46
[52] U.S. Cl. ............................................. 179/175.3 R
[58] Field of Search .......... 179/175.3 R, 175, 175.25, 179/175.3 F

[56] References Cited

U.S. PATENT DOCUMENTS

| | | | |
|---|---|---|---|
| 3,976,849 | 8/1976 | Champan | 179/175.3 R |
| 4,368,363 | 1/1983 | Ahuja | 179/175.3 R |
| 4,513,176 | 4/1985 | Fostveit | 179/175.3 R |
| 4,513,179 | 4/1985 | Phillips et al. | 179/175.3 R |

*Primary Examiner*—Stafford D. Schreyer
*Attorney, Agent, or Firm*—Russell J. Egan; Robert W. Pitts

[57] ABSTRACT

A telephone line tester is a self-contained unit which, when plugged into a premise wiring telephone jack, determines whether or not a signal of adequate power is being received. If a satisfactory signal is received, the tester will give a visual indication thereby denoting the operating condition of the telephone normally connected to the jack.

17 Claims, 7 Drawing Figures

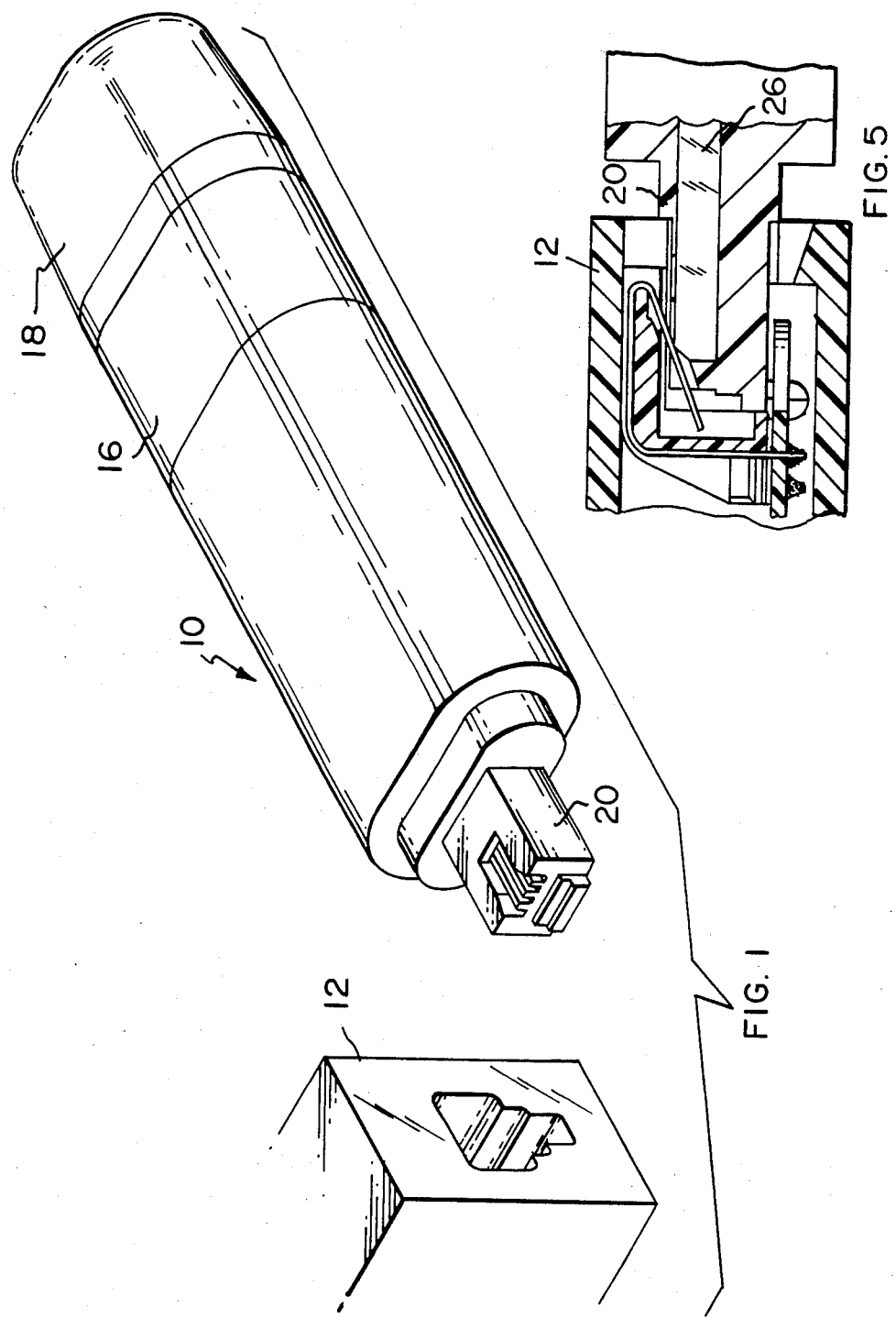

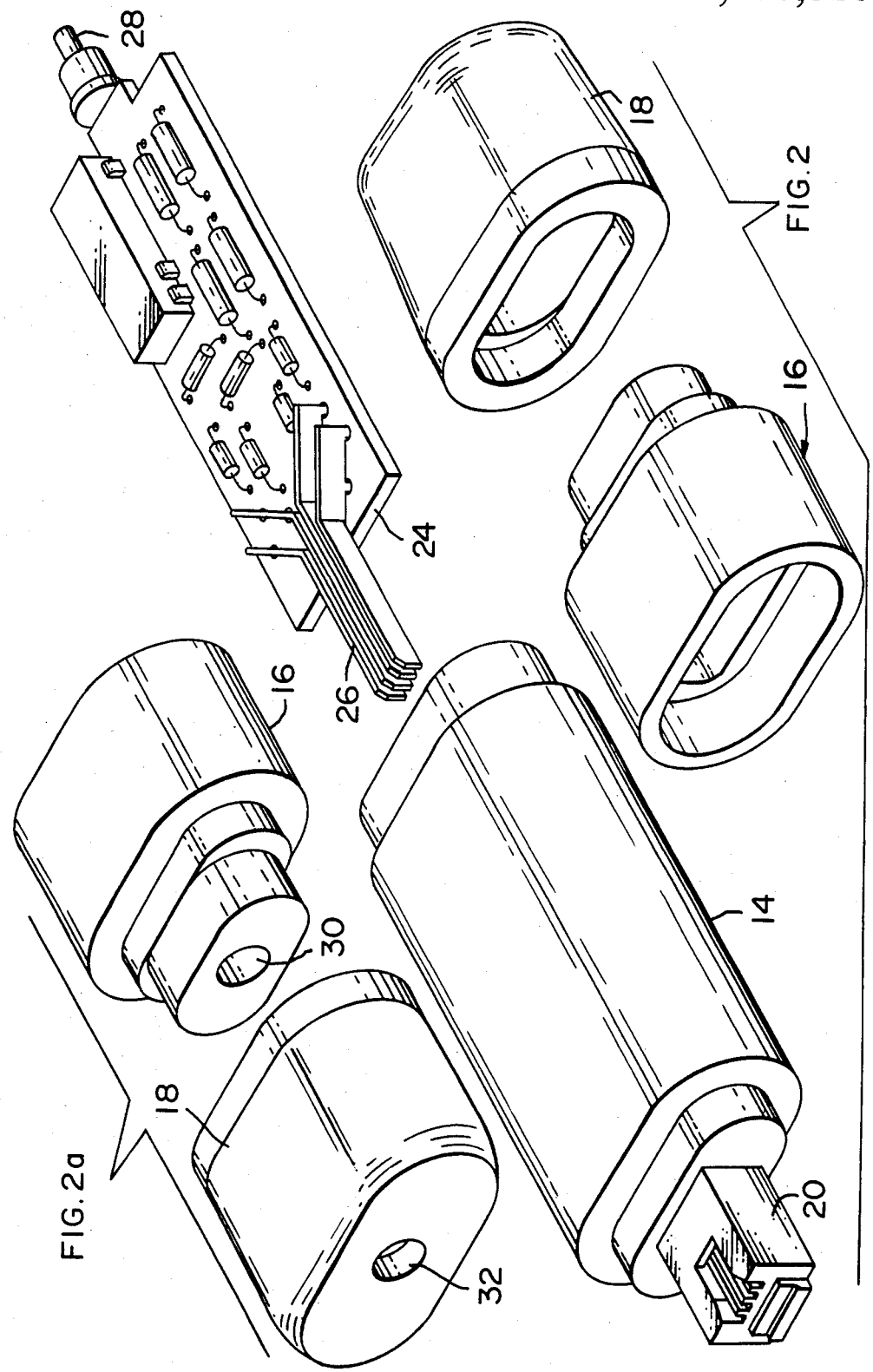

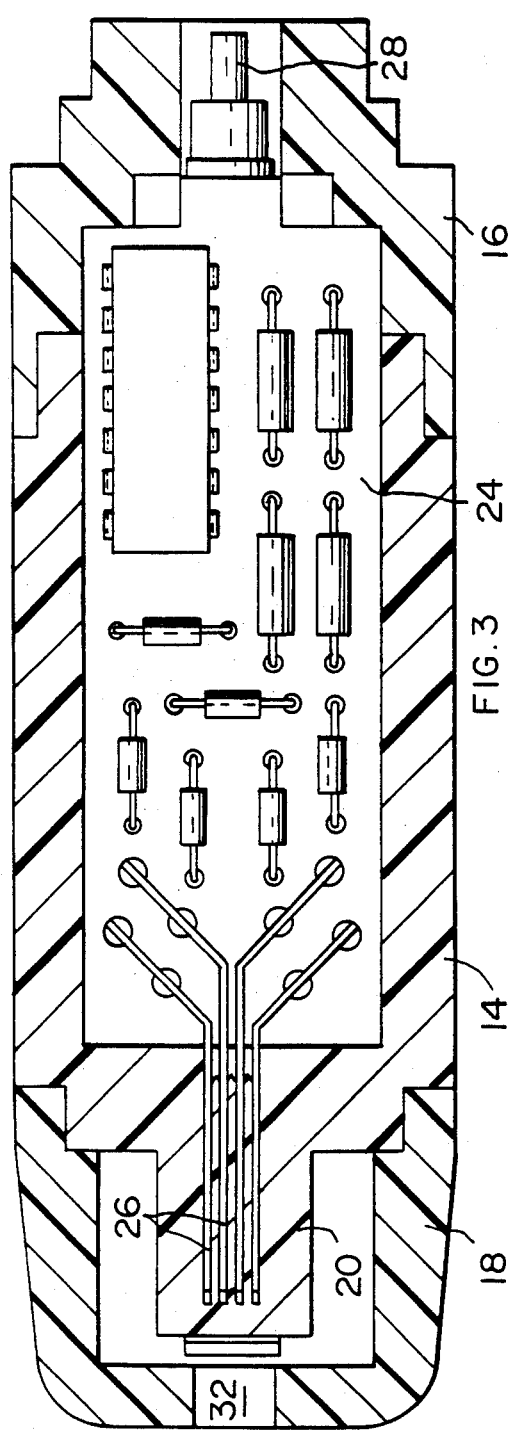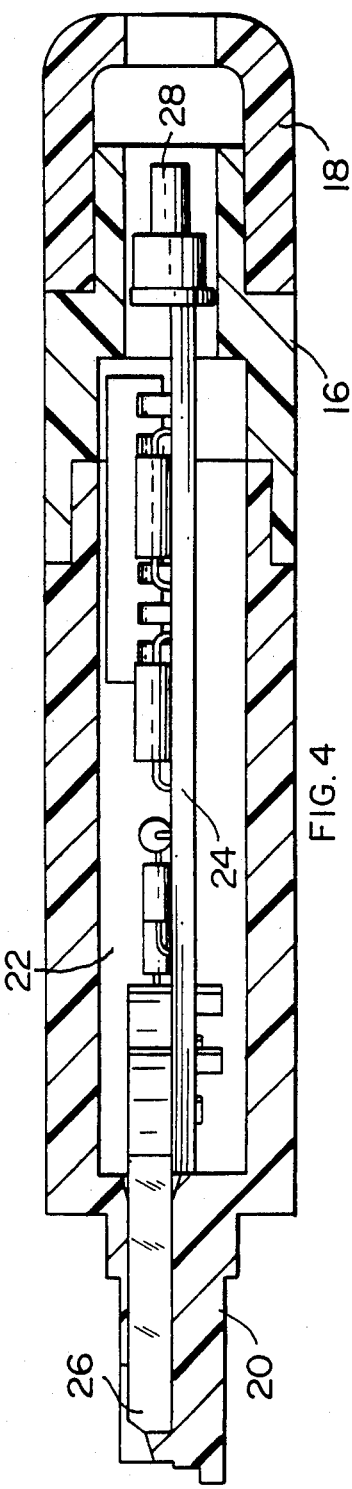

TELEPHONE LINE TESTER

The present invention relates to a telephone line tester and in particular to one which allows an unskilled person to troubleshoot a home telephone system.

The breakup of the nationwide telephone system into a number of regional systems in early 1984 created a lot of changes directly affecting telephone users. Among these changes are that a local building owner/resident is now responsible for the maintenance of the telephone system within his premises. The demarcation point between the telephone company responsibility and the homeowner's responsibility is at a network interface device which connects the local structure to the regional telephone company lines.

One way in which the premises telephone lines can be checked is to disconnect the telephone from within the premises, carry it to the network interface device and plug it in there. This directly connects the telephone set to the regional telephone network lines and, should the telephone work correctly, clearly identify the problem as being within the local premises wiring rather than within the telephone network. While this arrangement will work, it is somewhat inconvenient when the local premises has only a single telephone and it is hardwired to the system. To remove such a telephone to the network interface device would require a modular jack to be installed at the local premises. There are other times when it would be inconvenient to remove the telephone from within the local premises and carry it to the network interface device.

The present invention overcomes the above described difficulties and inconveniences by providing a telephone line tester to determine if the output of a telephone jack is proper. An unskilled telephone user can plug the subject telephone line tester into a telephone jack to isolate a fault in the telephone set or the premises wiring. The subject telephone line tester has a housing containing a test circuit with a jack on one end and a light emitting diode on the opposite end. Plugging of the subject tester into a jack and observation of the LED shows the test condition. A unique feature of the circuit is that, at the instant of switching from a NO GO to GO condition, current is decreased slightly to prevent current oscillation within the subject tester which could inadvertently inject a signal into the telephone network.

The present invention will now be described by way of example with reference to the accompanying drawings in which:

FIG. 1 is a perspective view of the subject telephone line tester exploded from a conventional telephone jack;

FIG. 2 is an exploded perspective view of the present invention showing the components thereof;

FIG. 2a is a perspective view of the opposite ends of the cap and cover;

FIG. 3 is a horizontal section through the subject telephone line tester;

FIG. 4 is a vertical section through the subject telephone line tester;

FIG. 5 is a partial section showing the engagement of the plug portion of the subject telephone line tester in a conventional jack.

Figure 6:
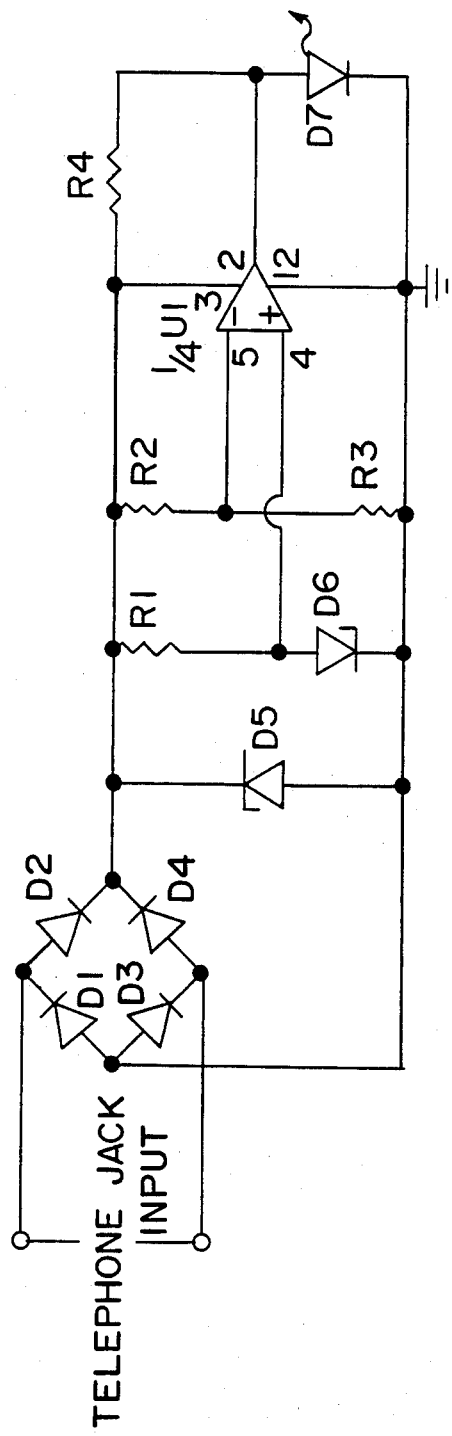
FIG. 6 is a schematic diagram of the circuitry of the present invention.

The subject telephone line tester 10 is shown in FIG. 1 removed from a conventional telephone jack 12. The subject telephone line tester 10 has an elongated housing 14 with a rear cap 16 on one end and a cover 18 on the other end. One end of the housing 14 has a telephone plug profile 20. This profile 20 also limits the depth of insertion of the tester 10 into a jack 12. The housing 14 and rear cap 16 define a central cavity 22 (see FIGS. 3 and 4) which receives therein a circuit board 24. One end of the circuit board 24 has a plurality of terminals 26 which are received in the telephone plug profile portion 20 to form a complete telephone plug. The circuit board 24 is also provided with a rearwardly directed condition-indicating LED 28. An audible or tactile indicator could be substituted for the visual indicator illustrated. The rear cap 16 is provided with a central aperture 30 through which the LED 28 is visible. The cover 18 has a central aperture 32 and is profiled to be received on either end of the housing 14 to enclose the plug profiled portion 20 or to form an extended enclosure around the LED 28 enabling easier viewing of the LED under bright ambient light conditions.

The compact arrangement of the present invention will be appreciated from FIGS. 3 and 4 which show the telephone line tester in an assembled condition with the cover enclosing the telephone plug portion (FIG. 3) or shielding the LED (FIG. 4).

FIG. 5 shows the mating of the subject tester with a conventional telephone jack, such as the type disclosed in U.S. Pat. No. 4,327,958, the disclosure of which is incorporated herein by reference.

The circuitry for the present invention is shown in FIG. 6. It is based on the assumption that the telephone impedance, which is replaced by the subject telephone line tester, is 400 ohms and that the talk mode current is the tested parameter, established to be 20 mA or higher.

Referring to FIG. 6, the circuit for the subject telephone line tester has an input section formed by diodes D1 through D5; a voltage reference R1, D6; a voltage divider R2, R3; a voltage comparator U1; and an output R4, D7. Diodes D1 to D4 form a full wave bridge rectifier and are connected across the ring and tip terminals 26. Application of either polarity of tip and ring to the full wave bridge rectifier results in proper positive and negative being routed to the circuitry. Zener diode D5 clamps the input signal so that voltages higher than test minimum are shunted to ground when they approach a level near maximum for the circuit components thereby preserving the circuitry.

Resistor R1 and reference diode D6 establish a reference voltage equal to the design threshold voltage selected for comparator switching. Threshold voltage is based on 400 ohms × 20 milliamps, or 8 volts. The 8 volt GO-NO GO or pass-fail criteria is measured at the tester input, then decreases by the diode drop of the rectifier bridge and voltage divider R2, R3. The value of these resistors is selected so that when tip and ring input to the bridge is 8 volts, the voltage node between R2 and R3 is equal to the selected reference voltage, causing comparator U1 to switch output states. The combined resistance of R2 and R3 is also selected to provide a 400 ohm impedance in conjunction with the series/parallel impedances of all other circuit components.

Voltage comparator U1 undergoes an output transition from LO to HI when the negative input at pin 5 becomes more positive than positive input at pin 4. It is seen that with a fixed voltage at pin 4, established by the voltage reference R1, D6, an output transition from LO to HI will occur whenever the node between R2 and R3, connected to pin 5 of U1, exceeds the reference voltage. Pin 5 will have a voltage above threshold for comparator switching whenever input is above 8 volts, as the node between R2 and R3 is always proportional to circuit input and the voltage reference is always constant with any voltage above the design minimum.

The input voltage which initiates an output transition, if well above the threshold, causes the voltage comparator to change states cleanly, without output oscillation. If, however, the input voltage is at an ambiguous level (very close to 8 volts), the comparator output would oscillate, due to line noise, circuit parasitic capacitances and comparator design deficiencies, if not addressed in the circuit design. Oscillation can be reduced by addition of appropriate RC or LC networks (not shown) but is more efficiently prevented in this circuit by providing feedback to the negative input (pin 5) of the comparator from the output (pin 2).

Generation of the feedback signal to eliminate oscillation is as follows: When test circuit input in less than 20 mA (under 8 volts), the comparator output is substantially at ground, providing a current path through transmission line resistance and R4 to ground through pin 2 U1. When 8 volts is reached, U1 output switches to a higher impedance so that a new current path is established from R4 through LED D7 to ground. This new current path is at a higher resistance so that there is less voltage drop along the transmission line and thus a higher voltage at the node between R2 and R3 at the instant of comparator switching, raising threshold voltage above an ambiguous level and "latching" the output.

The output signal in this example is visual, utilizing light emitting diode D7. When pin 2, U1 is LO, both anode and cathode are at ground potential so that the LED is "OFF". When pin 2 goes HI, as it does with more than 20 mA input to the line tester, circuit current flows through D7 from R4 providing a visible indication that the transmission line is sending at least 20 mA through a 400 ohm load. The output is latched when the input is at least 20 mA and will be unlatched at somewhat less than 20 mA so that small current fluctuations will not change output states or lead to circuit oscillation. The amount of hysteresis between latch and unlatch conditions is controlled by the designed mismatch between LED impedance and comparator sink transistor (U1 output ground path). Hysteresis increases as LED impedance increases with respect to U1 output current path to ground.

We claim:

1. A hand-held testing device for testing telephone tip and ring signal voltages comprising:
   a body portion,
   a test circuit attached to the body portion, the test circuit comprising voltage rectifer means for compensating polarity mismatches of the tip and ring signals as an input voltage,
   reference voltage means for establishing and holding constant a predetermined voltage,
   voltage divider means,
   voltage comparator means for comparing the reference voltage and the voltage across the voltage divider, and
   sensory means for indicating conditions where the tip and ring signal voltage exceeds the reference voltage, whereby
   the circuit may be connected to the telephone tip and ring signal thereby isolating faulty electronics in a telephone set or local premises wiring.

2. The device of claim 1 further comprising interconnection means for connecting the circuit to the tip and ring signal of the telephone wiring.

3. The device of claim 2 wherein the interconnection means comprises a modular plug for receipt into a telephone modular jack.

4. The device of claim 1 wherein the voltage rectifier means, the reference voltage means, and the voltage divider means are in parallel circuit configuration.

5. The device of claim 4 wherein the voltage rectifier means comprises a full wave bridge rectifier.

6. The device of claim 5 wherein the bridge is formed by four diodes.

7. The device of claim 4 wherein the reference voltage means comprises a load resistor in series with a zener diode.

8. The device of claim 7 wherein the voltage divider means comprises two load resistors in series.

9. The device of claim 8 wherein the positive input of the voltage comparator is taken between the load resistor and zener diode of the voltage reference means.

10. The device of claim 9 wherein the negative input of the voltage comparator is taken between the load resistors of the voltage divider.

11. The device of claim 10 wherein the voltage comparator has switching means to direct the current path.

12. The device of claim 11 wherein the switching means shunts the current path to ground when the voltage at the negative input to the voltage comparator is less than the reference voltage at the positive input.

13. The device of claim 11 wherein the switching means diverts the current path through the sensory means when the voltage at the negative input to the voltage comparator exceeds that of the voltage at the positive input.

14. The device of claim 1 wherein the sensory means is a light emitting diode.

15. The device according to claim 1 wherein said test circuit further comprises:
   latching means whereby ambiguous current approaching a threshold between pass and fail conditions will not cause an output oscillation between states.

16. The device according to claim 1 wherein said test circuit further comprises:
   unlatching means having a hysteresis such that a test current must fall below a threshold before a fail condition is indicated to prevent output oscillation.

17. The device according to claim 1 wherein said test circuit further comprises:
   both latching and unlatching means whereby output oscillation caused by switching at close-to-acceptable levels will be prohibited.

* * * * *